United States Patent
King et al.

(10) Patent No.: US 9,452,393 B2
(45) Date of Patent: Sep. 27, 2016

(54) DISPENSER KITS AND METHOD OF INCREASING VERSATILITY OF INLINE DISPENSERS

(71) Applicants: Joseph A King, Wayzata, MN (US); Jeffrey D Johnson, Edina, MN (US)

(72) Inventors: Joseph A King, Wayzata, MN (US); Jeffrey D Johnson, Edina, MN (US)

(73) Assignees: KING TECHNOLOGY, INC.; HOPKINS, INC.

( * ) Notice: Subject to any disclaimer, the term of this patent is extended or adjusted under 35 U.S.C. 154(b) by 0 days.

(21) Appl. No.: 14/545,545

(22) Filed: May 19, 2015

(65) Prior Publication Data
US 2015/0251142 A1    Sep. 10, 2015

Related U.S. Application Data

(60) Division of application No. 13/999,254, filed on Feb. 3, 2014, now Pat. No. 9,101,888, which is a continuation-in-part of application No. 13/573,021, filed on Aug. 14, 2012, now Pat. No. 9,314,747, and a continuation-in-part of application No. 13/998,250, filed on Oct. 15, 2013, now Pat. No. 9,039,988, which is a division of application No. 13/573,020, filed on Aug. 14, 2012, now Pat. No. 8,636,962.

(60) Provisional application No. 61/850,083, filed on Feb. 8, 2013, provisional application No. 61/628,096, filed on Oct. 24, 2011, provisional application No. 61/628,089, filed on Oct. 24, 2011.

(51) Int. Cl.
| | |
|---|---|
| B01D 17/06 | (2006.01) |
| B67D 5/56 | (2006.01) |
| B67D 3/00 | (2006.01) |
| E03B 11/00 | (2006.01) |
| B01F 1/00 | (2006.01) |
| B01F 5/04 | (2006.01) |
| B01F 15/00 | (2006.01) |
| C02F 1/68 | (2006.01) |
| C02F 1/76 | (2006.01) |
| C02F 103/42 | (2006.01) |

(52) U.S. Cl.
CPC ........... *B01F 1/0027* (2013.01); *B01F 5/0413* (2013.01); *B01F 5/0496* (2013.01); *B01F 15/00344* (2013.01); *C02F 1/688* (2013.01); *B01F 2215/0052* (2013.01); *C02F 1/76* (2013.01); *C02F 2103/42* (2013.01); *Y10T 29/49716* (2015.01)

(58) Field of Classification Search
CPC ........... A61L 2/00; C02F 1/10; C02F 3/1284
USPC ............ 210/748.16, 749; 422/261, 272, 311; 134/43, 84, 93; 221/92; 222/129, 478; 137/268
See application file for complete search history.

(56) References Cited

U.S. PATENT DOCUMENTS 1,320,396 A * 11/1919 Laird ............... C10G 31/08
                                                196/46

\* cited by examiner

*Primary Examiner* — Monzer R Chorbaji
(74) *Attorney, Agent, or Firm* — Jacobson & Johnson LLC

(57) ABSTRACT

A kit for increasing the capacity and versatility of an inline dispenser with the kit including a set of stackable dispenser cartridges and an extension for increasing the capacity of the system with the extensions having fasteners thereon for changing the capacity of the system without having to replace existing components of the system.

2 Claims, 4 Drawing Sheets

DISPENSER KITS AND METHOD OF INCREASING VERSATILITY OF INLINE DISPENSERS

CROSS REFERENCE TO RELATED APPLICATIONS

This application is a divisional application of U.S. application Ser. No. 13/999,254 filed on Feb. 3, 2014 (pending), which claims priority from provisional application titled DISPENSER KITS AND METHOD OF INCREASING VERSATILITY OF INLINE DISPENSERS Ser. No. 61/850,083 filed Feb. 8, 2013, and is a continuation-in-part of U.S. application Ser. No. 13/573,021 filed Aug. 14, 2012 (pending), which claims priority from provisional application 61/628,096 filed Oct. 24, 2011; and is a continuation-in-part of and U.S. application Ser. No. 13/998,250 filed Oct. 15, 2013 (pending), which is divisional application of Ser. No. 13/573,020 filed Aug. 14, 2012, (now U.S. Pat. No. 8,636,962), which claims priority from provisional application 61/628,089 filed Oct. 24, 2011.

STATEMENT REGARDING FEDERALLY SPONSORED RESEARCH OR DEVELOPMENT

None

REFERENCE TO A MICROFICHE APPENDIX

None

BACKGROUND OF THE INVENTION

There exists a number of inline dispensers for use in water systems and, particularly inline water systems, which are used for treating pool and spa water as well as other types of water suitable for a variety of purposes. One of the difficulties of using such systems is that the systems generally have limited capacity and limited dispersants and consequently limited control of water quality.

Since such inline systems are usually an integral part of a circulation system it can become costly to upgrade or change the system in order to improve or increase the capacity or the performance of the water treatment system. The invention described herein allows a person to enhance and increase the performance of a water treatment system as well as expand the performance of the water treatment system without having to remove or replace integral components of an existing inline dispensing system.

SUMMARY OF THE INVENTION

A kit and method for enhancing the water treatment process by converting an inline dispenser for holding bulk material into an inline dispenser for holding multiple cartridges in fluid communication with each other. The kit includes a housing extension to increase the capacity of the inline dispenser and a set of stackable dispensing cartridges with each of the stackable cartridges stacked in an end-to-end configuration and in fluid communication with at least one other adjacent dispensing cartridge. Each of the dispensing cartridges include a structural feature for maintaining engagement with either an adjacent dispensing cartridge or a dispensing housing to maintain a stable vertical flow path in each of the stackable cartridges.

DESCRIPTION OF THE PREFERRED EMBODIMENT

Figure 1:
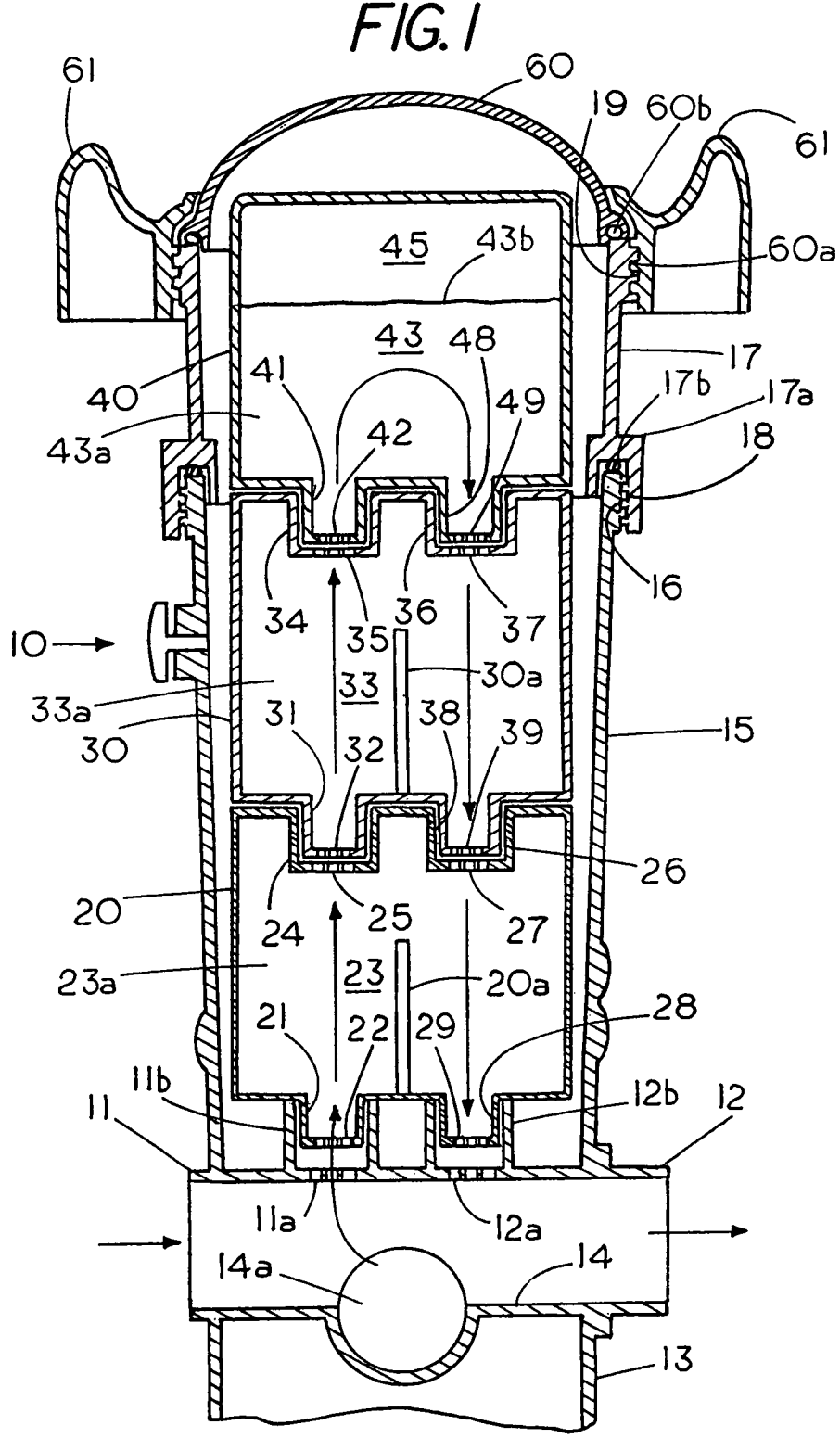
FIG. 1 is a cross sectional view of an inline dispenser, a housing extension and a cap with a set of stackable dispenser cartridges located therein.
Figure 4:
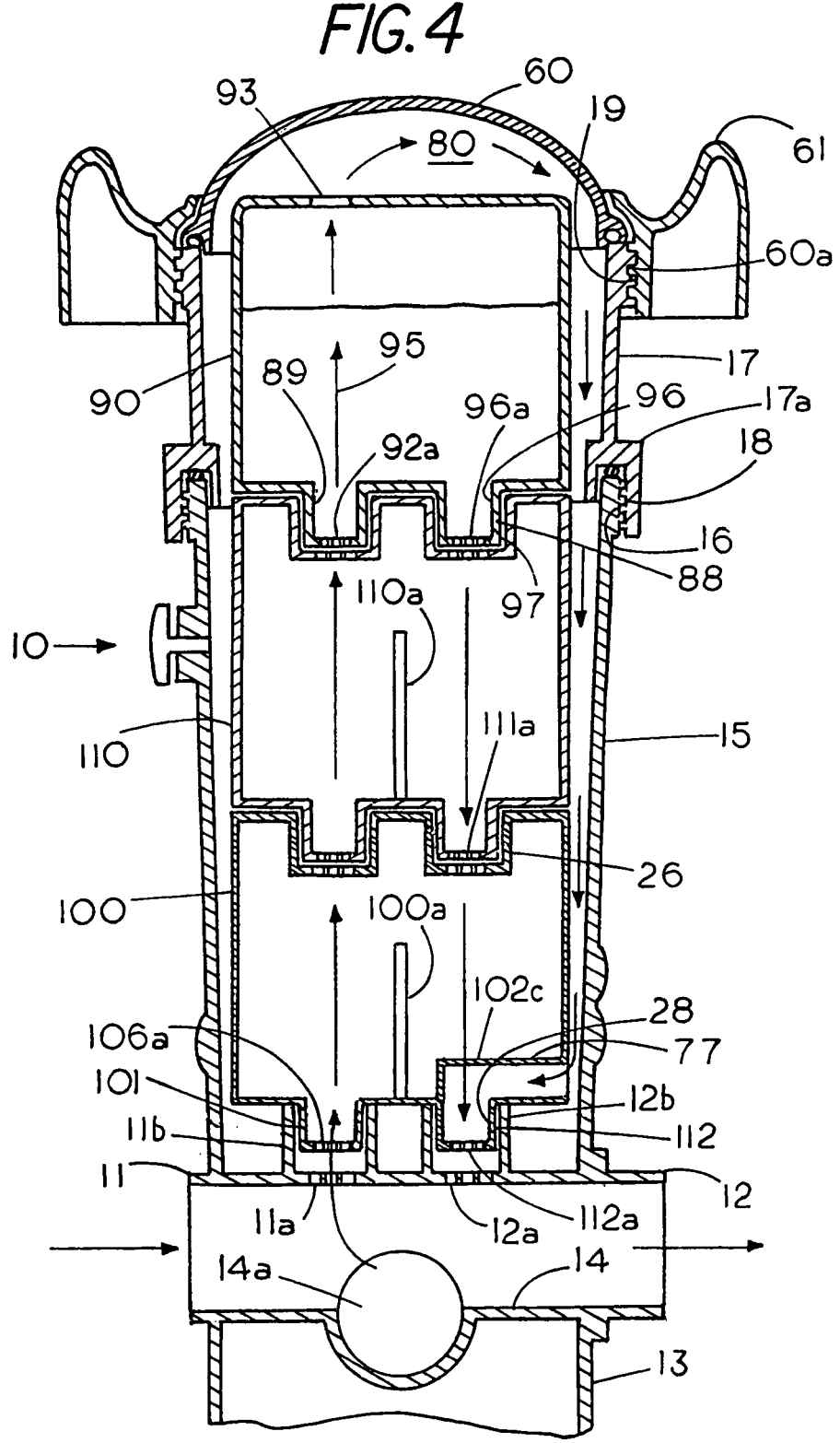
FIG. 4 is a cross sectional view of an inline dispenser and a cap extension with the set of stackable dispenser cartridges of FIG. 3 located therein.

FIG. 1 shows a sectional view of an inline dispenser 10 having a dispensing kit therein with the dispensing kit including a set of stackable dispensing cartridges forming a vertical column therein and a cylindrical dispenser extension 17, which is shown secured to a top end of a dispenser housing 15. The stackable dispensing cartridges include a first dispensing cartridge 20, a second dispensing cartridge 30 and a third dispensing cartridge 40 in axial alignment with each other with the second dispensing cartridge 30 stacked on top of the first dispensing cartridge 20 and the third dispensing cartridge 40 stacked on top of the second dispensing cartridge 30. The third stackable cartridge 40 includes a feature comprising an extension 41 and an extension 48 to maintain the third stackable cartridge 40 in mechanical engagement with the second stackable cartridge 30 to prevent rotation of the third dispensing cartridge 40 with respect to the second stackable cartridge 30 and the second stackable cartridge 30 includes a feature comprising an extension 31 and an extension 38 to maintain the second stackable cartridge 30 in mechanical engagement with the first stackable cartridge 20 to prevent rotation of the second stackable cartridge 30 with respect to the first stackable cartridge 20. Similarly, the first stackable cartridge 20 includes a feature comprising an extension 21 and an extension 28 to maintain the first stackable cartridge 20 in mechanical engagement with the socket 11b in housing 15 and the socket 12b in housing 20 to prevent rotation of the first stackable cartridges 20 with respect to housing 10. The arrangement of the stackable dispensing cartridges in a column and in engagement with each other and with the housing 15 allows one to maintain a fixed flow path between stackable cartridges that allows one to direct a fluid flow upward through each of the cartridges until it reaches the top stackable cartridge 40 as indicated by the arrows. After the fluid reaches the top stackable cartridge 40 the fluid returns to the main line 14 through each of the stackable dispensing cartridges as indicated by the arrows or may be directed to a path outside the stackable cartridges as illustrated in FIG. 4.

Dispenser 10 is of the type of inline dispenser shown in King U.S. Pat. Nos. 7,347,935; 6,190,547 and 6,527,952 which are hereby incorporated by reference. Dispenser 10 includes a base 13, which supports housing 15. Housing 15 includes a fluid passage 14 having an inlet end 11 for water to enter passage 14 and an outlet end 12 for water to exit passage 14. A diverter 14a extends into passage 14 to divert a portion of the fluid flowing through passage 14 into port 11a. Similar a port 12a permits return of diverted fluid to the passage 14 after the fluid has passed through the dispenser cartridges in the dispenser 10.

Located on top of housing 15 and threadingly secured thereto is a cylindrical extension 17 having a U shaped cylindrical hub 17a and a housing fastener comprising female threads 16 for threaded engagement to the male housing threads 18 on top end of the dispenser housing 15. The top of cylindrical extension 17 includes a male thread 19 for engagement with a female thread 60a on cover 60. Thus, cylindrical extension 17 includes a set of housing threads on one end for securement to the housing 15 and a set of cover threads on the other end for securing the threads of an existing cover to the extension 17 which is secured to the inline dispenser 15. Although threads are shown for securing to a housing other methods may be used without departing from the scope of the invention.

A resilient sealing ring 17b extends around the top of housing 15 to form a leakproof compression seal between housing 15 and extension 17. Similarly, a resilient sealing ring 60b extends around the top of extension 17 to form a leakproof compression seal between the cover 60 and the extension 17.

In this example the cover 60 includes a set of handles 61 for ease in hand closing or removing of cover 60 and cylindrical extension 17 comprises a cylindrical sleeve that has female threads 16 on one end that can be secured to the existing male threads 18 on the housing and male threads 19 on the opposite end of the extension 17 for mating with female threads 60a on the cover 60. The attachment of the cylindrical sleeve to the inline dispenser increases the capacity and the versatility of the dispensing system without having to change the structure of the dispensing system. In addition the set of stackable dispenser cartridges not only increases the volume of the inline dispenser but it also increases the range of water treatment functions since more water treatment materials may be contained within an inline dispenser with an extension secured thereto. Also, the system allows one to enhance the conventional water treatment functions that are normally used in existing inline dispensers through combinations of additional water treatment materials.

Located in the bottom portion of dispenser housing 15 is a first flow stackable dispensing canister or cartridge 20 having a chamber 23 for holding a first dispersant 23a therein. Cartridge 20 includes a first cylindrical extension 21 with a fluid port 22 therein and a second cylindrical extension 28 with a fluid port 29 therein. Extension 21 extends into socket 11b and extension 28 extends into socket 12b to prevent rotation of the cartridge 20. Cylindrical extension 21 with fluid port 22 is in fluid communication with fluid port 11a of housing 15 and cylindrical extension 28 with fluid port 29 is in fluid communication with fluid port 12a of housing 15. Located on the topside of cartridge 20 is a first socket 24 with a fluid port 25 therein and a second socket 26 with a fluid port 27 therein. In order to direct the fluid upward through cartridge 20 one may place a divider or separator 20a to direct the flow of water from port 11a to port 25 and to direct flow downward from port 27 to port 12a. In some instances the divider may be used to isolate water treatment materials from each other, a useful feature to allow two or more water treatment materials in the same cartridge, one which is introduced through vertical upward flow and the other through vertical downward flow. The extensions 21 and 28 provide a structural feature to engage housing 15 to maintain the orientation of the dispenser cartridge 20 as fluid flows therethrough.

Stacked on top of dispensing cartridge 20 is a second flow stackable dispensing canister or cartridge 30 having a chamber 33 for holding a second dispersant 33a therein. Cartridge 30 includes a first cylindrical extension 31 with a fluid port 32 therein and a second cylindrical extension 38 with a fluid port 39, which are located on the bottom of second stackable dispensing cartridge 30. The cylindrical extension 31 with fluid port 32 is in fluid communication with cylindrical receptacle or socket 24 and fluid port 25 and the cylindrical extension 38 with fluid port 39 is in fluid communication with cylindrical receptacle or socket 26 and fluid port 27. In order to direct the fluid upward through cartridge 30 one may place an internal divider or separator 30a within the dispenser cartridge to direct the flow of water from port 32 to port 35 and to direct flow downward from port 37 to port 39. In the above example, while extensions and receptacles, such as sockets, have been shown to maintain flow alignment other interlocking features may be used to maintain the dispensing cartridges in flow alignment in the dispenser 10 without departing from the spirit and scope of the invention.

Stacked on top of dispensing cartridge 30 is a third flow stackable dispensing cartridge 40 having a chamber 43 for holding a third dispersant 43a therein. Canister 40 includes a first cylindrical extension 41 with a fluid port 42 therein and a second cylindrical extension 48 with a fluid port 49, which are located on the bottom of third stackable dispensing canister 40. The cylindrical extension 41 with fluid port 42 is in fluid communication with cylindrical receptacle 34 and fluid port 35 and the cylindrical extension 48 with fluid port 49 is in fluid communication with cylindrical receptacle 36 and fluid port 37.

The third flow stackable dispensing cartridges 40 differs from flow stackable dispensing cartridge 30 and 20 in that cartridge 40 includes a chamber 43 with a closed top which allows one to form an air pocket 45 in cartridge 40, a feature which is beneficial when a dispersant such as a halogen is located therein since a portion of the halogen can be maintained in an unwetted condition for a period of time thus allowing one to extend the dispensing life of the halogen dispersant therein since the unwetted dispersant gradually falls into the water flowing through the bottom of the dispenser cartridge 40 as the halogen in the bottom of the dispensing cartridge 40 is consumed.

While one may use a separate extension 17 for increasing the internal volume of the dispenser in some cases one may want to eliminate the extension and fit the three stackable cartridges into the existing volume of the inline dispenser. In still other cases one may want to use more than three dispensing cartridges, a feature that can be accomplished with the invention described herein and the use of one or more extensions.

In the example shown one may place a metal ion donor in the first stackable cartridge, an auxiliary chemical in the second stackable cartridge and a halogen in the third stackable cartridge to enable all three stackable cartridges to be simultaneously maintained in a dispensing mode when placed in an inline dispenser. More specifically the first dispensing cartridge 20 may contain an immersible dispersant, the second dispensing cartridge 30 may contain an immersible dispersant 33 and the third dispensing cartridge 40 may contain an immersible dispersant 43 having a portion thereof that is initially maintained in an unwetted condition due to the air space 45 above a water line 43b and a portion in a wetted condition until the portion of immersible dispersant in the wetted condition is dispersed into the system.

Thus in the example of FIG. 1 the kit includes a first canister or cartridge 20 having a chamber 23 for holding a dispersant therein with the first cartridge 20 having a first extension 21 with a fluid port 22 therein and a second extension 28 with a fluid port 29 therein. Located on top of the first cartridge is a first socket 24 with a fluid port 25 therein and a second socket 26 with a fluid port 27 therein. The second cartridge 30 having a chamber 33 for holding a dispersant therein with the second cartridge having a first extension 31 with a fluid port 32 therein and a second extension 38 with a fluid port 39 therein with first extension 31 of the second cartridge in fluid engagement with the first socket 24 of first cartridge 20 and second extension 38 of the second cartridge 30 in fluid engagement with the second socket 26 of the first cartridge 20. The second cartridge 30 having a first top socket 34 with a fluid port 35 therein and a second top socket 36 with a fluid port therein 37. Similarly, the third cartridge 40 having a chamber 45 for holding a dispersant 43 therein with the third cartridge 40 having a first extension 41 with a fluid port 42 herein and a second extension 48 with a fluid port 49 therein with the first extension 41 of the third cartridge in fluid engagement with the first socket 34 of the second cartridge 30 and the second extension 48 of the third cartridge 40 in fluid engagement with the second socket 36 of the second cartridge 30 whereby the second cartridge 20 is stackable on top of the first cartridge 10 and the third cartridge 30 is stackable on top of the second cartridge 20 to provide a vertical flow path from the first cartridge 10 to the third cartridge 30 and a return flow from the third cartridge 30 to the first cartridge 10 to enable simultaneously delivery of dispersants from each of the cartridges connected to the water line 14.

Figure 2:
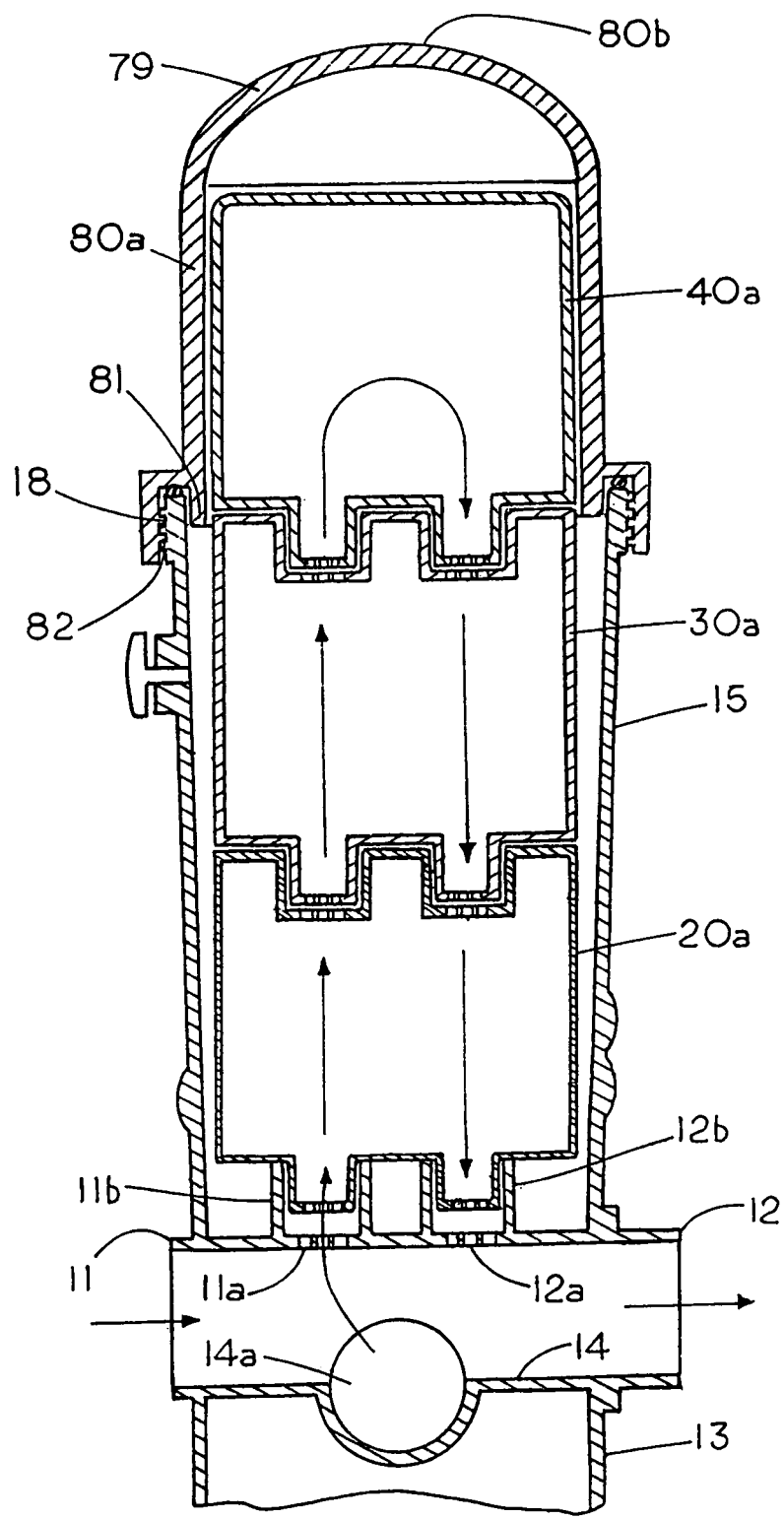
FIG. 2 is a cross sectional view of an inline dispenser and a cap extension with a set of stackable dispenser cartridges located therein.

FIG. 2 shows an alternate embodiment of the kit wherein the housing extension has been replaced by an elongated integral cover or cap 79 having a domed top 80b and a cylindrical side 80a. A cylindrical hub 81 includes female threads 82 for engaging the male threads 18 on the exterior of housing 15 with a resilient compression seal 17b to maintain a leakproof connection therebetween. In this example one uses an elongated integral one-piece cap 79 in place of the existing dispenser cover to form an enhanced dispensing chamber for holding a set of stacked dispensing cartridges 20a, 30a and 40a therein. The dispensing cartridges include the same locating features and sockets as the examples of FIG. 1, however, the separators are not used although if desired the cartridges may include separators or dividers.

Figure 3:
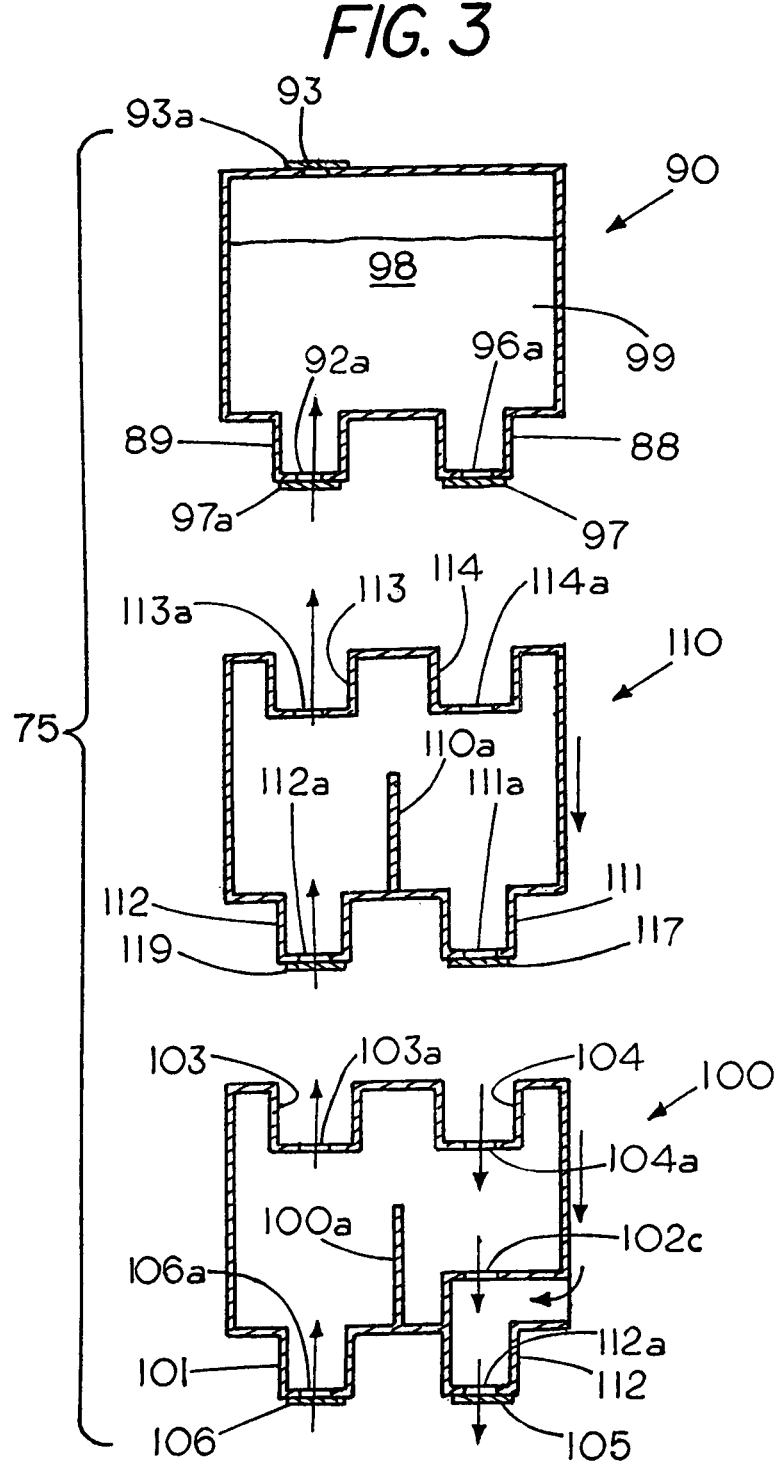
FIG. 3 is an exploded view of another set of stackable dispenser cartridges.

FIG. 3 shows an exploded view of dispensing cartridges 75 having an external fluid return path. The dispensing cartridges 75, which may be part of a kit including an extension, includes a set of vertically stackable dispensing cartridges comprising a first dispensing cartridge 100, a second dispensing cartridge 110 and a third dispensing cartridge 90 with the second dispensing cartridge 110 stackable on top of the first dispensing cartridge 100 and the third dispensing cartridge 90 stackable on top of the second dispensing cartridge 110 with the dispensing cartridges usable with the inline dispenser and extension of either FIG. 1, FIG. 2 or FIG. 4.

The third stackable cartridge 90 includes a first extension or structural feature 89 and a second extension or structural feature 88 to maintain the third stackable cartridge 90 in mechanical engagement with a socket 113 and socket 114 on the second stackable cartridge 110 to prevent rotation of the third dispensing cartridge 90 with respect to the second stackable cartridge 110. In addition to maintaining orientation the extension 89 has port 92a and extension 88 has port 96a and socket 113 has ports 113a and socket 114 has port 114a to maintain flow between the two cartridges.

Located at the end of extension 89 is a removable seal 97a and similarly located at the end of extension 88 is a removable seal 97. The purpose of removable seal 97a is to temporarily block ports 92a and the purpose of seal 97 is to temporarily or permanently block ports 96a. The use of removable seals to block the fluid ports of the dispenser cartridge is a useful feature that prevents spilling of contents of the dispenser during handling prior to installation in the inline dispenser. However, in the above arrangement seal 97 has a further purpose in that removable seal 97 can be retained on stackable cartridge 90 and used to change a flow pattern within an inline dispenser cartridge. That is by retaining removable seal 97 on extension 88 fluid is prevented from returning through ports 96a in extension 88 and ports 114a in extension 114. In this condition one may remove the top removable seal 93a from a top port 93 thus establishing a one way vertical flow path through the top of dispenser cartridge 90 as indicated by the arrows. Consequently, in this mode water flows though the materials 98 in only one direction and is not allowed return through the ports 96a of stackable cartridges 90 thus limiting the contact time with the material 98 therein, a feature useful in selecting dispersant rates and times.

In the example shown in FIG. 3 the second stackable cartridge 110 includes a male feature or extension 112 to maintain the second stackable cartridge 110 in mechanical engagement with socket 103 while a port 112a and a port 103a permit fluid flow between the two cartridges when the removable seal 119 is not present. Similarly, a second feature or extension 111 maintains the second stackable cartridge 110 in engagement with socket 104 of the first stackable cartridge 100 to prevent rotation thereof while a port 111a and a port 104a permit flow therebetween when seal 117 is removed. If desired port 111a may be closed off by leaving removable seal 117 in place thus providing an alternate flow path through the second dispensable cartridge 110.

The first stackable cartridge 100 includes a male feature or extension 101 to maintain the second stackable cartridge 100 in mechanical engagement with a socket in the inline dispenser while a port 106a and a port 103a permit fluid flow between the first and second cartridges when the removable seal 106 is not present. Similarly a second feature or extension 112 also maintains the first stackable cartridge in mechanical engagement with a socket in the inline dispenser while a port 104a, a port 102c and a port 112a permit flow therethrough. A removable seal 106 and a removable seal 105 provide for temporary blockage of the bottom ports 106a and 112a. In this example port 102c may be sealed thus preventing a return flow through dispensing cartridge 100.

The arrangement of the stackable dispensing cartridges in engagement with each other and with the housing allows one to maintain a fixed flow path between stackable cartridges that allows one to direct a fluid flow upward through each of the cartridges until it reaches the top stackable cartridge 90 as indicated by the arrows. After the fluid reaches the top stackable cartridge 90 the fluid returns to the main line outside of the dispensers. In this example cartridge 110 includes a separator 91 and cartridge 100 also includes a separator to direct fluid in upward toward the top of the dispenser cartridges. As described herein the stacking of the dispensing cartridges and the selective control of the fluid ports provides multiple options for changing the flow pattern through the dispensing cartages, which enables one to better tune the release of dispersants into a body of water.

FIG. 4 shows how the dispensing cartridges 90, 110 and 100 can be maintained in an inline dispenser 15 to form a one way flow path through the dispersants in two or less of the dispensing cartridges. In the example shown the fluid flows upward from line 14 through dispensing cartridges 100, 110 and 90 and discharges to chamber 80 through port 93. Some fluid may be returned through ports 111a and ports 100a. The fluid that flows upward through port 93 then flows downward along the outside of the dispensing cartridges 90, 110, and 100 as indicated by the arrows. At the bottom of the dispenser cartridges the fluid is directed into the line 14 through an elbow 77 that has a top opening or port 102c. Thus a feature of the invention is that the flow pattern through dispensing cartridges can be selected based on the type and amount of dispersant that is to be dispensed.

While one may use a separate extension 17 for increasing the internal volume of the dispenser in some cases one may want to eliminate the extension and fit multiple stackable cartridges into the existing volume of the inline dispenser. In still other cases one may want to use more than three dispensing cartridges, a feature that can be accomplished with the invention described herein.

In the example as shown in FIG. 4 each of the cartridges have a smaller cross sectional dimension than the dispenser housing to form a circumferential or annular vertical flow path between the outside of the stackable cartridges and the inside of the inline dispenser housing 16. With each of the dispenser cartridges 100, 110 and 90 at least partially spaced from an inside surface of the inline dispenser one can provide a return flow path that bypass the contents of the dispenser cartridges thus providing further optional control of dispersant dispensing.

The invention as shown and described includes a kit and method for increasing the capacity or versatility of an inline dispenser where the kit includes an extension having a housing fastener and a set of at least two stackable cartridges wherein each of the stackable cartridges include a mateable feature for engaging an adjacent stackable cartridge for holding the stackable cartridges in a fluid flow alignment.

While the ports of the dispenser cartridge may comprise a plurality of openings or a single opening the opening may be sized sufficiently large to permit fluid to flow therethrough but sufficiently small to prevent passage of an undissolved dispersant therethrough thus allowing the dispenser cartridges to be used with different dispersants.

A feature of the example of FIG. 2 is that at least two of the three stackable cartridges may be interchanged with each other thus providing further options for deliver of dispersants into a body of water. While the invention is shown with a set of three stackable cartridges additional cartridges may be added through use of additional extensions or through use of smaller dispensing cartridges thus allowing one to configure an existing inline dispenser to perform additional functions without having to replace the inline dispenser.

We claim:

1. A method of converting an existing inline dispenser to a multiple material inline dispenser by increasing the capacity of a water treatment system for a body of water without the need to remove and replace the existing inline dispenser comprising:

securing a first end of a cylindrical extension to a housing of the existing inline dispenser to increase the volume of the existing inline dispenser, said housing having a leakproof resilient sealing ring extending around a top of said housing to provide a leakproof seal between the housing and the cylindrical extension;

placing a first dispensing cartridge holding a first dispersant in a lower portion of a chamber in the housing with a set of extensions on the first cartridge in engagement with a set of sockets in the inline dispenser;

placing a second dispensing cartridge holding a second dispersant on top of the first dispensing cartridge and in fluid communication with the first dispensing cartridge;

placing a third dispensing cartridge holding a third dispersant on top of the second dispensing cartridge and in fluid communication with the second dispensing cartridge;

securing either a second end of a cylindrical extension to a dispenser cover, with the dispenser cover having a further leakproof resilient scaling ring located between a top of the cylindrical extension and a bottom of the cover to provide a leakproof seal between the cylindrical extension and the dispenser cover or securing a cylindrical extension with an integral cover to the existing inline dispenser with the leakproof resilient ring providing a leakproof seal between the cylindrical extension with the integral cover and the housing; and directing a fluid flow upward through the first dispensing cartridge, the second dispensing cartridge, the third dispensing cartridge and downward through an outlet end to dispense the dispersants into the body of water.

2. The method of claim 1 wherein placing the second dispensing cartridge on top of the first dispensing cartridge comprises mechanically engaging the second dispensing cartridge with the first dispensing cartridge to prevent rotation of the first dispensing cartridge with respect to the second dispensing cartridge.

* * * * *